United States Patent [19]
Dinkel et al.

[11] Patent Number: 4,799,403
[45] Date of Patent: Jan. 24, 1989

[54] ADJUSTING GEAR IN MOTOR VEHICLES

[75] Inventors: Emil Dinkel, Coburg; Bernd Mann, Pfarrweisach; Günter Prieser, Coburg; Gerhard Schneyer, Grosswalbur, all of Fed. Rep. of Germany

[73] Assignee: Brose Fahrzeugteile GmbH & Co. KG, Coburg, Fed. Rep. of Germany

[21] Appl. No.: 104,078

[22] Filed: Oct. 5, 1987

[30] Foreign Application Priority Data

Oct. 6, 1986 [DE] Fed. Rep. of Germany ....... 3634020

[51] Int. Cl.$^4$ .................... F16H 3/44; F16H 57/10
[52] U.S. Cl. ................................. 74/788; 74/801
[58] Field of Search .................. 74/750 R, 785, 788, 74/797, 801; 297/362; 29/434, 467

[56] References Cited

U.S. PATENT DOCUMENTS

| | | | |
|---|---|---|---|
| 3,106,997 | 10/1963 | White | 74/797 X |
| 3,600,977 | 8/1971 | Bogie | 74/801 |
| 3,964,334 | 6/1976 | Hicks | 74/801 X |
| 4,133,344 | 1/1979 | Hunter et al. | 74/801 X |
| 4,521,055 | 6/1985 | Fudala | 74/788 X |
| 4,641,887 | 2/1987 | Klueting | 74/801 X |

FOREIGN PATENT DOCUMENTS 2928705 1/1981 Fed. Rep. of Germany ....... 74/788
3322863 1/1985 Fed. Rep. of Germany .

Primary Examiner—Leslie A. Braun
Assistant Examiner—Dwight G. Diehl
Attorney, Agent, or Firm—Barnes & Thornburg

[57] ABSTRACT

In an adjusting gear in a motor vehicle, especially for a motor-driven seat adjustment mechanism, with an essentially pot-shaped transmission housing in which are supported on a bearing shaft, starting from the pot bottom, a pinion, a planet gear carrier with planet gears, a sun gear meshing with the planet gears as well as a worm gear non-rotatably connected with the sun gear; according to this invention, the end face of the planet gears opposite the pot bottom are provided with at least one orientation surface, the worm gear is also provided on its end face opposite the pot bottom with at least one orientation surface and the end face of the planet gears are each constructed with an abutment surface for the abutment at the worm gear. This enables a facilitated assembly of the adjusting gear, especially with the aid of an assembly robot.

19 Claims, 1 Drawing Sheet

ADJUSTING GEAR IN MOTOR VEHICLES

BACKGROUND AND SUMMARY OF THE INVENTION

The present invention relates to an adjusting gear in a motor vehicle, especially for a power seat adjustment, and to a method for assembling the same, which includes an essentially pot-shaped transmission housing in which the following elements are supported on a bearing shaft, starting from the pot bottom in the following sequence:

an output pinion member,
a planet gear carrier non-rotatably connected with the output member and having at least two planet gears supported on bearing pins which mesh with internal circumferential teeth of the transmission housing,
a sun gear also meshing with the planet gears, and
a work gear non-rotatably connected with the sun gear which meshes with a work driven by a driving motor.

An adjusting gear or transmission of this type is disclosed in the DE-OS No. 33 22 863 (FIG. 3). The bearing shaft is formed in this prior art arrangement by axial projections 52, 54 which protrude on both sides from the pinion made in one piece with the planet gear carrier. The planet gears are preassembled on the planet gear carrier prior to the assembly whereby the bearing pins are provided with heads enlarged in diameter which fix the planet gears in the axial direction on the bearing pins. The assembly of this known adjusting gear is relatively costly because during the insertion of the planet gear carrier together with the planet gears, attention must be paid that all (for example, four) planet gears are properly oriented in order to come into engagement with the inner circumferential teeth of the transmission or gear housing and do not get stuck at the corresponding gear teeth. Similarly, during the subsequent installation of the sun gear, attention must be paid that the sun gear does not become stuck at the teeth of the planet gears but is able to come into engagement with the planet gears. The preassembly of the planet gears on the planet gear carrier lengthens the required assembly time.

By contrast, it is the object of the present invention to provide an adjusting gear of the aforementioned type which can be assembled in a more simple manner, especially with the aid of automatic assembly apparatus.

The underlying problems are solved according to the present invention in that the end face of the planet gears opposite the pot bottom are provided with at least one orienting surface for the oriented mounting on the bearing pins, in that the worm gear is provided on its end face opposite the pot bottom with at least one orienting surface for the oriented mounting on the bearing shaft, and in that the end face of the planet gears is provided with an abutment surface for the abutment at the backside of the worm gear disposed opposite the end face of the worm gear.

During the assembly of the adjusting gear or transmission according to the present invention, the transmission parts can be inserted sequentially into the transmission housing, namely, at first the planet gear carrier together with the output member in an orientation relative to the fixed transmission housing predetermined by the planet gear axes, thereafter the planet gears are inserted in an orientation predetermined by the orienting surfaces in such a manner that an immediate engagement of the individual planet gears in the inner circumferential teeth of the transmission housing is assured. Subsequently, the worm gear together with the sun gear non-rotatably connected with the same can be mounted in an orientation predetermined by the orienting surfaces in such a manner that the sun gear comes immediately into engagement with the individual planet gears. The axial fixing of the planet gears is now assured by way of the abutment surfaces of the planet gears which abut at the back side of the worm gear. These assembly steps can be carried out without any difficulties by an assembly robot. The preassembly of the planet gears can be dispensed with.

It is proposed that the end faces of the planet gears and/or of the work gear are proposed each with assembly tool-engaging surfaces parallel to the bearing shaft axis. The assembly tool-engaging surfaces can be manufactured in a simple manner without impairing the shape of the abutment surfaces and enable that the respective part not only can be oriented at these engagement surfaces but can also be seized thereat.

The planet gears can be manufactured in a simple manner together with a low friction wear of the abutment surfaces at the worm gear if, according to another feature of the present invention, the planet gears are constructed with dead-end bores for the accommodation of the bearing pins, and the end faces are provided with a spherically shaped central area for the formation of the abutment surfaces.

The assembly of the adjusting gear is further facilitated according to the present invention, in that the bearing shaft is pressed into or riveted into the pot bottom of the transmission housing. In a first operating step, the bearing shaft is therefore inserted into the pot bottom of the transmission housing and then serves for the next following assembly steps as guidance for the parts to be mounted thereon.

The bearing shaft can be provided with a bearing collar which abuts, on the one hand, at the pot bottom of the transmission housing and, on the other, at the output member. The bearing collar therefore prevents a slipping-through of the bearing shaft during the pressing-in or riveting operation; additionally, it serves as axial counter-bearing for the output member, especially the pinion.

A pinion is preferably utilized as the output member which meshes with a toothed segment part or a toothed rack supported outside of the gear housing and entering into the gear housing through a corresponding aperture. However, for example, a cable drum could be used as an output member. The output member is preferably constructed in one piece with the planet gear carrier, preferably consisting of sintered metal. In the alternative, the output member and the planetary gear carrier can be inserted one within the other and riveted together with each other. The worm gear may be constructed in one piece with the sun gear so that a rotational bearing support of this part with a correspondingly large-area on the bearing shaft circumference results. The construction of the planetary gear carrier of sintered metal assures a high mechanical stability of the planetary gear carrier-support so that a proper inter-engagement of the teeth of sun gear and planet gears is assured with the possibility to make the planet gears as well as the worm gear together with sun gear of plastic material. The manufacturing costs of the mass-produced product adjusting gear in a motor vehicle are correspondingly reduced. This adjusting gear is preferredly used with a seat adjustment (longitudinal adjustment and inclination/height adjustment) even though the use of the adjusting gear for the back rest inclination adjustment is also possible, or in conjunction with a window lifter.

According to still another feature of the present invention, it is proposed that the output member, planetary gear carrier, sun gear and worm gear are rotatably supported on the bearing shaft, and that the end of the bearing shaft remote from the pot bottom is supported in a housing cover. In this manner the bearing shaft is supported at both ends. In order to preclude any possible axial play of the components mounted on the bearing shaft (for noise and wear reduction), it is proposed according to the present invention that a spring-elastic prestressing element, preferably a spring disk or spring washer, is inserted between the worm gear and the housing cover. This spring disk or washer can be inserted by an assembly robot.

In order to achieve as accurate as possible a centering of the bearing shaft inside of the transmission housing without any special expenditure, it is proposed according to the present invention that the housing cover be provided with at least one, preferably ring-shaped, positioning projection abutting at the inside of the transmission housing.

For an assembly-friendly rapid connection of the housing cover and transmission housing, it is additionally proposed according to the present invention that the housing cover is clasped together with the transmission housing.

The present invention also relates to a method for the assembly of the adjusting gear of the type described hereinabove, which is characterized in that the bearing shaft is pressed-in into the pot bottom, the output member together with the planetary gear carrier non-rotatably connected with the same is mounted over the bearing shaft in predetermined orientation, the planet gears are mounted in predetermined orientation on the bearing pins, the sun gear non-rotatably connected with the work gear is mounted in predetermined orientation on the bearing shaft and is connected with the transmission housing.

In order to avoid preassembly of the bearing pins on the planet gear carrier, it is further proposed that after mounting the planet gear carrier and prior to mounting the planet gears, the bearing pins be mounted on the planet gear carrier.

BRIEF DESCRIPTION OF THE DRAWINGS

These and other objects, features and advantages of the present invention will become more apparent from the following description when taken in connection with the accompanying drawings, which show, for purposes of illustration only, one embodiment in accordance with the present invention, and wherein.

DETAILED DESCRIPTION OF THE DRAWINGS

Figure 1:
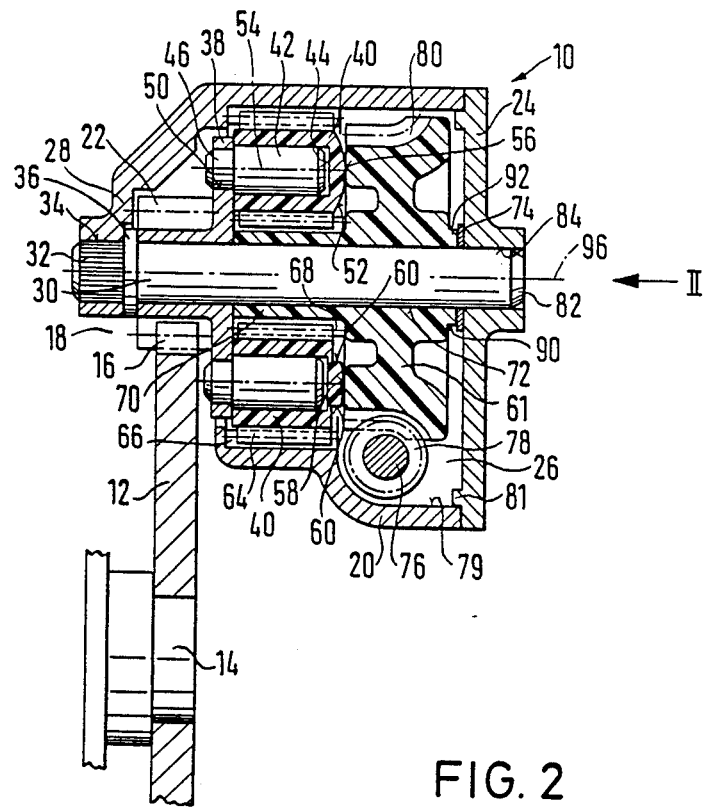
FIG. 1 is an axial cross-sectional view taken along line I—I of FIG. 2 of an adjusting gear in accordance with the present invention.

Referring now to the drawing wherein like reference numerals are used throughout the two views to designate like parts, an adjusting gear generally designated by reference numeral 10 is illustrated in FIG. 1 in a simplified manner as part of a motor-driven inclination-/height adjustment mechanism of a motor vehicle seat. One can recognize in FIG. 1 a pivot lever 12 of the seat adjustment mechanism which is pivotally supported on a bearing bolt 14, and which at its upper end as viewed in FIG. 1 is provided with a toothed sector 16 that engages through a lateral opening 18 of a transmission housing 20 into the adjusting gear 10. A pinion 22 inside of the adjusting gear 10 as output member of this gear meshes with the toothed sector 16.

The transmission housing 20 is approximately pot-shaped with a pot opening 26 closed by a housing cover 24 and with the pot bottom 28 disposed opposite the housing cover 24, in which a bearing shaft 30 is pressed-in with its left end as viewed in FIG. 1, which is preferably provided with serrations 32, into a corresponding through-opening 34.

A bearing collar 36 of the bearing shaft 30 abuts, on the one hand, at the inside of the pot bottom 28 and, on the other, at the corresponding end face of the pinon 22. The pinion 22 is constructed of sintered metal in one piece with a planetary gear carrier 38 which carries three to five planet gears 40. The planet gears 40 are rotatably supported on bearing pins 42 which engage in corresponding dead-end bores 44 of the planet gears 40. These bearing pins 42 are each inserted by means of an end section 46 reduced in diameter (in FIG. 1 at the left) into correspondingly dimensioned insert openings 50 of the planetary gear carrier 38.

Figure 2:
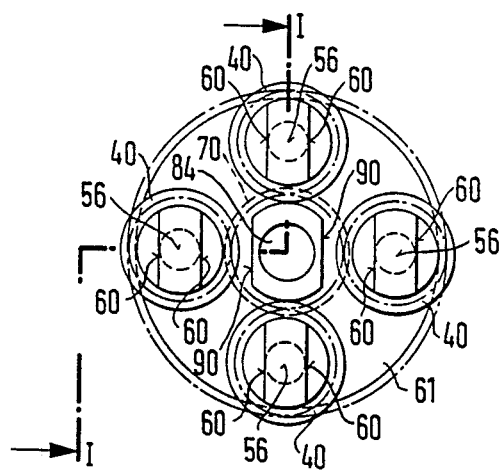
FIG. 2 is a schematic view on the parts of the adjusting gear according to FIG. 1 in the direction of arrow II.

The end faces 52 of the planet gears 40 opposite the pot bottom 28 are constructed spherically shaped; the center area concentric to the respective planet gear axis 54 serves as abutment surface 56 for the abutment at the oppositely disposed backside 58 of a worm gear 61. In addition to these abutment surfaces 56, the end faces 52 of the planet gears 40 are provided, as indicated in FIG. 2, with assembly tool-engagement surfaces 60 parallel to the axis 54. Two such engagement surfaces 60 are which mutually parallel and mutually oppositely directed are formed on each planet gear 40 which can be realized by corresponding milling, respectively, injection molding of the planet gears preferably consisting of plastic material. The two engagement surfaces 60 form two flat surfaces, capable of being seized by a pincer-like work tool, respectively, of an assembly robot.

The planet gears 40 mesh with their external circumferential teeth 64, on the one hand, with an internal circumferential toothed arrangement 66 of the transmission housing 20 and, on the other, with an external toothed arrangement 68 of a sun gear 70 constructed of plastic material in one piece with the worm gear 61. Like the component consisting of pinion 22 and planet gear carrier 38, the component consisting of sun gear 70 and worm gear 61 is also rotatably supported on the outer circumference 72 of the bearing shaft 30. The sun gear 70 abuts end-face at the pinion 22, and more particularly under a predetermined prestress determined by a spring washer or spring disk 74 between worm gear 61 and housing cover 24.

A worm 76 driven by a driving motor (not shown) and possibly connected with the same, for example, by way of a flexible shaft, and supported in the transmission of gear housing 20, for example, as disclosed in the DE-OS No. 33 22 863, engages with its worm teeth 78 in an externally toothed arrangement 80 of the worm gear 61.

The housing cover 24 is provided with a ring-shaped positioning projection 81 abutting at the inside 79 of the transmission housing 20 within the area of the housing opening 26. The positioning projection 81 serves for the exact automatic centering of the housing cover 24 and therewith for the accurate orientation of the bearing shaft 30 inside of the transmission housing 20 as the right end 82 of the bearing shaft 30, as viewed in FIG. 1, is inserted into a corresponding bearing opening 84 of the housing cover 24 for the two-sided shaft bearing support.

FIG. 2 illustrates schematically the four planet gears 40 with their engagement surfaces 60 and their abutment surfaces 56 which engage into the sun gear 70 indicated in dash line. Additionally, the contour of the worm gear 61 is indicated together with bearing opening 84. In order to enable a robot assembly of the worm gear 61 with predetermined worm gear orientation, the worm gear 61 also is provided with assembly tool-engagement surfaces 90 corresponding to the surfaces 60 of the planet gears 40. These surfaces 90 can be realized in a corresponding manner by milling or injection-molding. One can also see from FIG. 1 a neck 92 of the worm gear 61 surrounding the bearing shaft, which is flattened off at mutually opposite sides for the formation of these surfaces 90. The surfaces 90 are parallel to one another and parallel to the axis 96 of the bearing shaft 30.

The assembly of the adjusting gear 10 described hereinabove takes place in the following manner:

As a first step the bearing shaft 30 is inserted into the transmission housing 20, fixed in a corresponding die or support, from the side of the housing opening 26 and is pressed into the opening 34 or riveted into the same until the bearing collar 36 abuts at the pot bottom 28. This step can already be undertaken by an assembly robot as also the subsequent steps which require always the feed of the corresponding part from the same side of the transmission housing.

The pinion 22 is made in one piece with the planet gear carrier 38 and is subsequently mounted over the bearing shaft 30 from the right, as viewed in FIG. 1, whereby the four insert openings 50 which extend through the planet gear carrier 38 enable an easy assembly of this component in predetermined rotational position. In order to fix this rotational position for the subsequent assembly steps, a component with sector teeth corresponding to the lever 12 may be fixed securely at the die or support so that the assembled pinion cannot rotate.

Thereafter, the bearing pins 42 are inserted into the four insert openings 50. Thereupon, the four planet gears 40 are seized at the engagement surfaces 60 and are mounted in predetermined orientation on the bearing pins 42 in engagement with the internal teeth 64 of the transmission housing 20. Now, the worm gear 61 is seized at the surfaces 90 by the assembly robot and is mounted in predetermined orientation on the bearing shaft 30 until finally the toothed arrangement 68 of the sun gear 70 comes into engagement with the teeth 64 of the planet gears 40 and finally abuts end-face at the planet gear carrier 38. In this abutment position, the backside 58 of the worm gear 61 abuts at the abutment surfaces 56 of the planet gears 40 or maintains a slight spacing with respect to the same in order to fix in this manner the planet gears 40 in the axial direction on the bearing pins 42.

After mounting the spring disk 74, the housing cover 24 is finally installed and rigidly connected with the transmission housing, especially is clasped together in a conventional manner not illustrated.

While we have shown and described only one embodiment in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. An adjusting gear for a motor vehicle, comprising essentially pot-shaped transmission housing means having a bottom, a bearing shaft in said transmission housing means, a plurality of elements mounted on said bearing shaft which, starting from the bottom of the pot-shaped housing means, include in sequence an output member, a planet gear carrier non-rotatable connected with the output member and having at least two planet gears supported on bearing pins, said planet gears meshing with internal teeth in the transmission housing means, a sun gear also meshing with the planet gears, and a worm gear non-rotatably connected with the sun gear which meshes with a worm adapted to be driven by a driving motor, an end face of the planet gears opposite the pot bottom being provided with at least one orientation surface for oriented mounting on the bearing pins, the worm gear being provided on its end face opposite the pot bottom with at least one orientation surface for oriented mounting on the bearing shaft, and the end face of the planet gears being each provided with an abutment surface abutting at the backside of the worm gear which is disposed opposite the end side of the worm gear.

2. An adjusting gear according to claim 1, wherein the adjusting gear is for a motorized seat adjustment of a motor vehicle.

3. An adjusting gear according to claim 1, wherein the output member is a pinion.

4. An adjusting gear according to claim 1, wherein the end faces of at least one of planet gears and worm gear are provided with assembly tool-engagement surfaces substantially parallel to the bearing shaft axis.

5. An adjusting gear according to claim 4, wherein the planet gears as well as the sun gear made in one piece with the worm gear are made of plastic material.

6. An adjusting gear according to claim 4, wherein the output member, the planetary gear carrier, the sun gear and the worm gear are rotatably supported on the bearing shaft, and wherein the end of the bearing shaft remote from the pot bottom of the transmission housing means is supported in a housing cover means.

7. An adjusting gear according to claim 6, further comprising a spring-elastic prestress element is inserted between the worm gear and the housing cover means.

8. An adjusting gear according to clai 6, wherein the housing cover means is provided with at least one positioning projection abutting at the inside of the transmission housing means.

9. An adjusting gear according to claim 6, wherein the housing cover means is clasped together with the transmission housing means.

10. An adjusting gear according to claim 1, wherein the planet gears are provided with dead-end bores for the accommodation of the bearing pins, and wherein the end faces thereof are each provided with a spherical central area for the formation of the abutment surfaces.

11. An adjusting gear according to claim 1, wherein the bearing shaft is pressed into the pot bottom of the transmission housing means.

12. An adjusting gaer according to claim 11, wherein the bearing shaft is provided with a bearing collar which abuts, on the one hand, at the pot bottom of the transmission housing means and on the other, at the output member.

13. An adjusting gear according to claim 1, wherein the output member is constructed in one piece with the planetary gear carrier.

14. An adjusting gear according to claim 13, wherein the output member is made of sintered metal.

15. An adjusting gear according to claim 1, wherein the planet gears as well as the sun gear made in one piece with the worm gear are made of plastic material.

16. An adjusting gear according to claim 1, wherein the output member, the planetary gear carrier, the sun gear and the worm gear are rotatably supported on the bearing shaft, and wherein the end of the bearing shaft remote from the pot bottom of the transmission housing means is supported in a housing cover means.

17. An adjusting gear according to claim 16, further comprising a spring-elastic prestress element is inserted between the worm gear and the housing cover means.

18. A method for assembling an adjusting gear, comprising the steps of pressing a bearing shaft into a bottom of a pot shaped transmission housing, mounting an output member and a planetary gear carrier non-rotatably connected to said output member on the bearing shaft in predetermined orientation, mounting planet gears in predetermined orientation on bearing pins, mounting a sun gear non-rotatably connected with a worm gear in predetermined orientation on the bearing shaft, and mounting a housing cover on the bearing shaft and connecting the cover with the transmission housing.

19. A method according to claim 18, wherein the bearing pins are inserted into the planetary gear carrier after the mounting of the planetary gear carrier on the bearing shaft and prior to the mounting of the planet gears.

* * * * *